United States Patent [19]

Pessia

[11] 4,063,844
[45] Dec. 20, 1977

[54] TAPPING T FOR PLASTIC PIPE

[75] Inventor: Thomas Pessia, Bradford, Pa.

[73] Assignee: Dresser Industries, Inc., Dallas, Tex.

[21] Appl. No.: 659,810

[22] Filed: Feb. 20, 1976

Related U.S. Application Data

[63] Continuation of Ser. No. 496,501, Aug. 12, 1974, abandoned.

[51] Int. Cl.² .................. B23B 41/08; F16L 41/04
[52] U.S. Cl. ......................... 408/204; 137/318
[58] Field of Search ............... 408/204, 227, 92; 137/317, 318

[56] References Cited

U.S. PATENT DOCUMENTS

| | | | |
|---|---|---|---|
| 3,307,435 | 3/1967 | Floren | 408/92 X |
| 3,532,113 | 10/1970 | McKean | 137/318 |
| 3,606,565 | 9/1971 | Morain et al. | 408/204 X |
| 3,617,145 | 11/1971 | Celmer et al. | 408/204 |

FOREIGN PATENT DOCUMENTS

| | | | |
|---|---|---|---|
| 1,028,839 | 4/1958 | Germany | 137/318 |
| 2,315,172 | 10/1974 | Germany | 137/318 |
| 2,035,667 | 4/1971 | Germany | 408/204 |

*Primary Examiner*—Robert D. Baldwin
*Assistant Examiner*—William R. Briggs
*Attorney, Agent, or Firm*—Daniel Rubin

[57] ABSTRACT

A tapping T for effecting a house outlet connection on non-metallic plastic pipe. A tapping tool is threadedly supported in the body of a tapping T service connector adapted for mounting on a pipe main under pressure. The cutting nose of the tool is secured on a plastic head and is comprised of a smooth, thin wall circularly tubular sleeve the radial end facing of which is serially stepped axially inward in a repetitively controlled pattern of sequential relief about its periphery. To cut a slug or coupon, the cutting nose via the head is threadedly advanced into the pipe wall while a screw extending centrally outward of the cutting nose aids in retaining the cut coupon within the open bore of the sleeve.

10 Claims, 4 Drawing Figures

TAPPING T FOR PLASTIC PIPE

CROSS REFERENCE TO RELATED APPLICATION

This is a continuation of application Ser. No. 496,501, filed Aug. 12, 1974, now abandoned.

BACKGROUND OF THE INVENTION

1. The field of art to which the invention pertains includes the art of fluid handling as specifically directed toward tapping a pipe main under pressure.

2. Tapping T's for effecting a house outlet connection are available from a variety of manufacturers and are widely used for tapping gas service from underground gas mains. Exemplifying tapping T's of the prior art as principally adapted for metal pipe are those disclosed in U.S. Pat. Nos. 3,094,137; 3,264,907; 3,277,683; 3,295,398; and Re 26,224. Typically, such tapping T service connectors include a body having a side outlet house connection integral therewith and adapted for secured mounting onto the exterior of the pipe. The tapping tool is threadedly supported in the body for radial advancement against the pipe wall until effecting a penetration or cutting of a removable slug by which an opening is formed communicating with the branch connection. A characteristic requirement of such tapping T's is that the tool should be capable of penetrating and/or cutting the pipe wall at turning torque levels on the order of about 13 to 20 ft/lbs. This is within reasonable strength capability of an average workman using an 8 inches long wrench. At the same time, it is desirable to maintain these torque levels so that the operator will sense loss of torque signalling penetration of the pipe wall. Failure to sense penetration can, of course, result in overtravel with consequent damage to the piping system.

With the advent of plastic pipe and/or tubing and their approval by regulating governmental agencies for natural gas transmission, it has been found that tapping T tools of the prior art intended for retaining a cut slug from metal pipe are generally considered much too expensive for use with plastic pipe. That is, such tools for metal pipe are generally manufactured from high price steel which is carefully machined and heat treated. In keeping with the change to plastic pipe various tool designs of less expensive construction have been proposed. Among those adopted has been a more or less tubular end with a circular cutting edge but which has not proven entirely satisfactory on plastic pipe by virtue of the relatively high-torque levels it encounters in cutting a slug. At the same time, these tools have encountered extreme "breakaway" torques required to free the tool in the event tool turning is momentarily interrupted. Despite recognition of these problems, a ready solution in the form of a low cost slug retaining tapping T suitable for use with plastic pipe and operable within prescribed torque limits has not heretofore been known.

SUMMARY OF THE INVENTION

The invention relates to a low cost tapping T construction suitable for plastic pipe and more specifically to such a tapping T capable of retaining the cut slug yet operable within prescribed torque limits for such tools. This is achieved in accordance with the invention by means of a house outlet service connector adapted for leak-proof mounting into a pipe main of plastic composition. Threadedly supported within the body of the service connector is a tapping tool having a plastic body with a wrench socket on its top side and a tubular metal cutting nose attached on its underside. For cutting a slug or coupon from the pipe wall, the tubular cutting nose is comprised of smooth, thin wall, circularly tubular stock, the radial end facing of which is serially stepped axially inward in a repetitively controlled pattern of sequential relief about its periphery. By only machine finishing the end facing, machining costs are maintained at a minimum. A screw extending from the tool body centrally outward of the cutting nose aids in retaining a cut coupon within the open bore of the cutting nose.

It is therefore an object of the invention to provide a novel tapping T particularly useful with plastic pipe.

It is a further object of the invention to provide a novel tapping T capable of retaining a cut slug from the wall of plastic pipe yet operable within the torque limits generally prescribed for such T's.

It is a still further object of the invention to effect the foregoing objects with a relatively inexpensive construction compatible with the general cost structure associated with the use of plastic piping.

Figure 1:
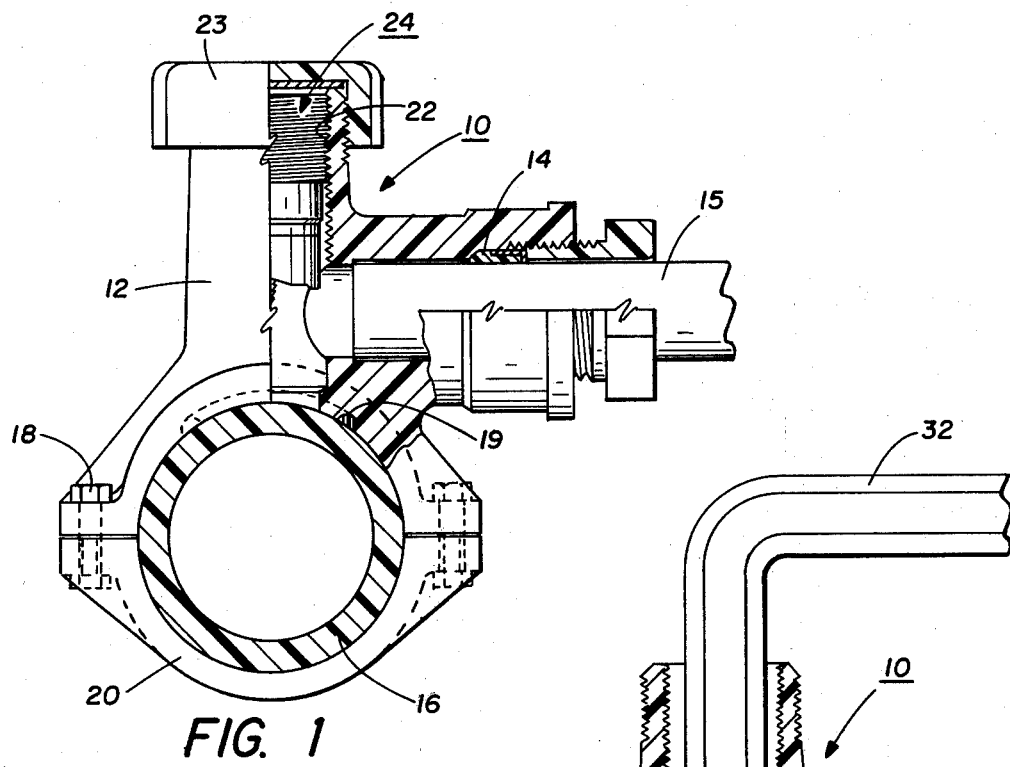
FIG. 1 is an elevation of a service connector partially in section of a tapping T in accordance herewith as initially supported on a plastic pipe.

Referring now to the drawings, there is illustrated in FIG. 1 a service connector 10 comprising a body 12 of generally plastic composition having an integral side house outlet 14 receiving branch piping 15. The body is constructed for positioning atop the exterior periphery of a plastic pipe 16 and can be joined via capscrews 18 to an understrap 20 for secured mounting on the pipe. An annular gasket 19 provides a leak-tight seal thereabout. Plastic pipe of the type under consideration is of a type generally governed by federal regulations Title 49, Section 192, "Transportation of Natural and Other Gas by Pipeline-Minimum Safety Regulations" — Fed. Reg. Vol. 35, No. 161 and, for example, may comprise Aldyl "A" polyethylene piping marketed by DuPont or rigid PVC.

Figures 2, 3:
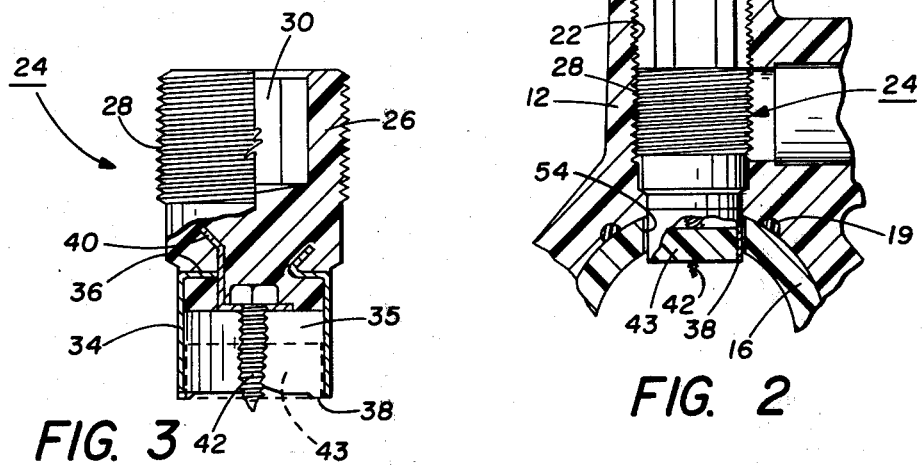
FIG. 2 is a fragmentary duplication of FIG. 1 illustrating the tool in its post-cutting relation to the pipe wall.
FIG. 3 is an enlarged elevation partially in section of the tapping tool utilized in the service connector of FIG. 1.

Threadedly supported at 22 in the upper neck of body 12 closed by cap 23 is the tapping tool 24 in accordance herewith. As most clearly shown in FIG. 3, tool 24 is comprised of a plastic head or body 26 threaded at 28 for cooperating with body thread 22 and including on its topside a hollowed socket cavity 30 for receipt of a suitable wrench 32. At the underside of body 26, there is supported a tubular cutting nose 34 having turned over flanges 36 on its topside for anchored support in body 26. Nose 34 extends away from the body to define a tubular cavity 35 and terminates in a radially extending cutting face 38 to be described. Centrally secured via an anchor 40 on the turning axis of body 26 as to extend outward of the cutting nose is a self-tapping screw 42 which aids in retention of a slug 43 cut from the pipe wall as will be understood. Cutting nose 34 is formed annular from thin, smooth, flat stock such as 24 gauge type 410 stainless steel to preferably have a wall thickness on the order of about 1/64th – 1/32nd inches. The diameter of nose 34 is compatible with the size of tool body 26 while generally coinciding with the size of a pipe slug 43 intended to be cut. Face 38 throughout the cutting periphery is blunt in extending radially relative to the axis of nose 34 in order to avoid any bending action that could otherwise be encountered in the course of forcing it through the pipe wall.

Figure 4:
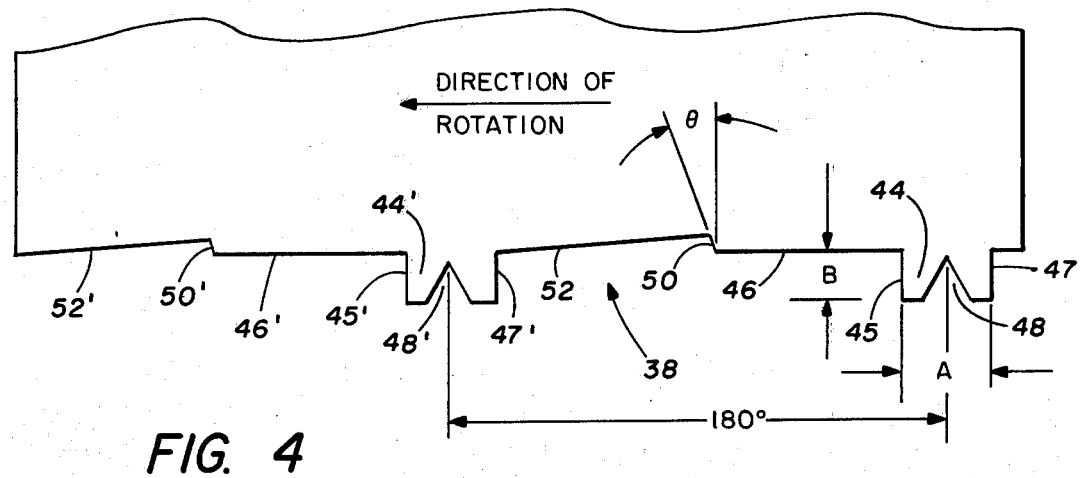
FIG. 4 is an unwrapped profile of the cutting edges along the cutting end of the tool.

Comprising cutting face 38 is the profile most clearly illustrated unwrapped in planar form in FIG. 4. As there shown, the leading edge, i.e., the axial extremity, of the cutting nose is comprised of a pair of 180° displaced protruding teeth 44 (44') each having a circumferential extent "A" of about ¼ inch and an axial depth "B." This defines a cutting shoulder 45 (45') on the rotationally forward front face of each tooth having a rear shoulder 47 (47'). Depth "B" is preferably greater than ½ the pitch of threads 28 up to about 50 percent in excess thereof. An inward V-slot 48 (48') centrally formed in the end face of each tooth 44 reduces the friction and consequent heat generation during the cutting operation as might otherwise occur. Forming cutting edge 45, therefore, is a first axially inward relief step of depth "B" at the merging of shoulder 45 into circumferentially extending arcuate face segment 46 (46'). Face 46, in turn, terminates a cutting shoulder 50 (50') extending axially rearward at an axial offset angle θ on the order of about 30°. In this manner, shoulder 50 forms a second axially inward relief step in merging with a circumferential arcuate face segment 52 (52') extending obliquely forward from shoulder 50 toward tooth shoulder 47' to restore depth "B" thereat.

Comparative testing of this tool repetitively on nominal PVC 12 inch pipe having 12¾ inch O.D. and a 0.406 inch wall thickness was performed against an otherwise similar prior art tool absent the stepped relief and tooth slot 48 along the cutting face. The torque at each revolution was measured from the onset of cutting through penetration as was the breakaway torque after a 30 second stop about halfway through the pipe wall. Results on the average were as follows:

| Avg. Torque (ft/lbs.) | Prior Art Tool | This Tool | Percent Reduction (approx.) |
| --- | --- | --- | --- |
| Max. | 28.3 | 19.3 | 31.7 |
| Min. | 6.7 | 5 | 25.3 |
| Per/Rev. | 18.4 | 13.9 | 24.5 |
| Breakaway | 42 | 29 | 31.0 |

While not completely understood, it is believed that primary cutting with the stepped relief face hereof is effected by shoulder faces 45 (45'). Also, that secondary cutting is effected by angled shoulder faces 50 (50') which principally function to remove material buildup in the kerf of pipe being cut. Stepped relief of edges 52 (52') enables contact avoidance with the kerf bottom for eliminating friction therebetween that could otherwise be generated by contact.

In operation, the service connector is mounted on pipe main 16 in the manner generally illustrated in FIG. 1. With cap 23 removed, a wrench 32 is inserted in socket 30 for rotating tool 24 to thread it downwardly against the pipe periphery. Thereafter, continued downward advance of the tool causes the cutting face 38 of nose 34 to initiate a cutting action into the pipe wall. Concomitantly therewith, screw 42 is threaded into the pipe wall for drawing slug 43 inwardly of nose cavity 35 until a complete slug is loosely severed in the manner illustrated solid in FIG. 2 and in phantom in FIG. 3. Thereafter, the tool with slug retained is backed off as to leave an opening 54 communicating line pressure with side outlet 14 and branch pipe 15. Cap 23 is then restored, and the operation is completed.

By the above description there has been disclosed a novel tapping T for use with non-metallic plastic pipe able to penetrate relatively heavy wall thicknesses at a substantial reduction in torque as compared to similar purpose devices of the prior art. At the same time, the simplicity of its construction of relatively inexpensive materials without need for heat treat and extensive machining renders it economical to fabricate. On this basis, the tool is maintained highly competitive with similar purpose devices of the prior art on which these virtues are absent.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. In a tapping T for non-metallic plastic pipe including a threaded main body portion defining an axis of rotation, wrench engaging means formed on one end of said body and an at least substantially continuous circularly tubular metallic cutting nose at the other end of said body, the improvement comprising an end face on said cutting nose having a generally blunt cutting edge with a planar portion normal to said axis extending substantially throughout the cutting nose and operatively adapted to effect pipe wall penetration throughout its at least substantially continuous periphery, said end face in a circumferentially continuous direction having successively stepped portions axially relieved from said planar portion in a repetitive control pattern about the periphery thereof.

2. A tapping T according to claim 1 including a screw member supported on the axis of the nose cavity extending toward the end face of said nose for screwed retention of a pipe slug cut loose by said cutting nose.

3. In a tapping T according to claim 1 in which said end face includes a plurality of teeth extending axially forwardmost thereon and circumferentially displaced about said periphery.

4. In a tapping T according to claim 3 in which said control pattern is defined on said end face in the circumferential displacement between said teeth.

5. In a tapping T for non-metallic plastic pipe including a threaded main body portion defining an axis of rotation, wrench engaging means formed on one end of said body and a substantially continuous circularly tubular metallic cutting nose at the other end of said body, the improvement comprising an end face on said cutting nose including a plurality of teeth extending axially forwardmost thereon circumferentially displaced about the periphery thereof, said end face in a circumferentially continuous direction being successively stepped progressively in the same axial direction in a repetitive control pattern of sequential relief about said periphery defined on said end face in the circumferential displacement between said teeth, said control pattern comprising a first axially inward relief step defined by an axial shoulder on a tooth of said teeth and a second axially inward relief step defined circumferentially intermediate adjacent of said teeth.

6. In a tapping T according to claim 5 in which the tip of each of said teeth is centrally recessed.

7. In a tapping T according to claim 5 in which said second relief step is defined by a second shoulder intermediate adjacent arcs on the circumference thereof.

8. In a tapping T according to claim 7 in which said second shoulder is obliquely angled relative to the axis of said nose inclined toward the direction of rotation from its axially outer end to its axially inner end.

9. In a tapping T according to claim 8 in which a first of said adjacent arcs initiates from said axial tooth shoulder on a first side face of one tooth and the second of said adjacent arcs terminates at the opposite side face of the circumferentially displaced next tooth.

10. In a tapping T according to claim 9 in which the end surface of said end face extends substantially radial substantially throughout.

* * * * *